US 8,004,211 B2

(12) United States Patent  
Van Erp

(10) Patent No.: US 8,004,211 B2
(45) Date of Patent: Aug. 23, 2011

(54) LED LIGHTING DEVICE

(75) Inventor: Josephus Adrianus Maria Van Erp, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 455 days.

(21) Appl. No.: 12/096,926

(22) PCT Filed: Dec. 12, 2006

(86) PCT No.: PCT/IB2006/054779
§ 371 (c)(1),
(2), (4) Date: Jun. 11, 2008

(87) PCT Pub. No.: WO2007/069200
PCT Pub. Date: Jun. 21, 2007

(65) Prior Publication Data
US 2008/0303452 A1    Dec. 11, 2008

(30) Foreign Application Priority Data
Dec. 13, 2005    (EP) ..................................... 05112040

(51) Int. Cl.
H05B 41/36    (2006.01)
(52) U.S. Cl. ...................... 315/294; 315/185 R; 315/226
(58) Field of Classification Search ............. 315/209 R, 315/224, 225, 291, 307, 185 R, 210, 226, 315/294, 308
See application file for complete search history.

(56) References Cited

U.S. PATENT DOCUMENTS

| 4,017,847 | A | 4/1977 | Burford et al. |
| 5,688,042 | A | 11/1997 | Madadi et al. |
| 6,016,038 | A | 1/2000 | Mueller et al. |
| 6,072,280 | A | 6/2000 | Allen |
| 6,150,771 | A | 11/2000 | Perry |
| 6,150,774 | A | 11/2000 | Mueller et al. |
| 6,153,980 | A | 11/2000 | Marshall et al. |
| 6,166,496 | A | 12/2000 | Lys et al. |
| 6,211,626 | B1 | 4/2001 | Lys et al. |
| 6,292,901 | B1 | 9/2001 | Lys et al. |
| 6,340,868 | B1 | 1/2002 | Lys et al. |
| D457,667 | S | 5/2002 | Piepgras et al. |
| D457,669 | S | 5/2002 | Piepgras et al. |
| D457,974 | S | 5/2002 | Piepgras et al. |
| 6,396,466 | B1 * | 5/2002 | Pross et al. ...................... 345/82 |
| D458,395 | S | 6/2002 | Piepgras et al. |
| 6,431,719 | B1 | 8/2002 | Lau et al. |
| D463,610 | S | 9/2002 | Piepgras et al. |
| 6,459,919 | B1 | 10/2002 | Lys et al. |
| 6,461,019 | B1 | 10/2002 | Allen |
| D468,035 | S | 12/2002 | Blanc et al. |

(Continued)

FOREIGN PATENT DOCUMENTS

DE    3832109    3/1990

(Continued)

*Primary Examiner* — Jacob Y Choi
*Assistant Examiner* — Jimmy T Vu

(57) ABSTRACT

The present invention relates to a multiple LED driver circuit in which each LED (15, 17) is controlled by a bypass switch (19, 21). The LEDs are supplied by a switched mode power supply (8) and are connected to a constant current source to draw a predetermined current through the LEDs. The switched mode power supply is arranged to output different voltages depending on the number of switched-on LEDs. This is carried out by supplying the control signals ($sw_1$, $sw_2$) of the bypass switches to the switched mode power supply. In this way, the power dissipation of the constant current source can be kept at a low level.

5 Claims, 2 Drawing Sheets

U.S. PATENT DOCUMENTS

| | | |
|---|---|---|
| 6,528,954 B1 | 3/2003 | Lys et al. |
| 6,548,967 B1 | 4/2003 | Dowling et al. |
| 6,570,505 B1 | 5/2003 | Malenfant |
| 6,577,080 B2 | 6/2003 | Lys et al. |
| 6,580,228 B1 | 6/2003 | Chen et al. |
| 6,608,453 B2 | 8/2003 | Morgan et al. |
| 6,621,235 B2 | 9/2003 | Chang |
| 6,624,597 B2 | 9/2003 | Dowling et al. |
| 6,636,003 B2 | 10/2003 | Rahm et al. |
| 6,680,579 B2 | 1/2004 | Allen et al. |
| 6,717,376 B2 | 4/2004 | Lys et al. |
| 6,720,745 B2 | 4/2004 | Mueller et al. |
| D491,678 S | 6/2004 | Piepgras et al. |
| D492,042 S | 6/2004 | Piepgras et al. |
| 6,774,584 B2 | 8/2004 | Lys et al. |
| 6,777,891 B2 | 8/2004 | Lys et al. |
| 6,781,329 B2 | 8/2004 | Mueller et al. |
| 6,788,011 B2 | 9/2004 | Mueller et al. |
| 6,801,003 B2 | 10/2004 | Schanberger et al. |
| 6,806,659 B1 | 10/2004 | Mueller et al. |
| 6,869,204 B2 | 3/2005 | Morgan et al. |
| 6,883,929 B2 | 4/2005 | Dowling |
| 6,888,322 B2 | 5/2005 | Dowling et al. |
| 6,897,624 B2 | 5/2005 | Ducharme et al. |
| 6,936,978 B2 | 8/2005 | Morgan et al. |
| 6,965,205 B2 | 11/2005 | Piepgras et al. |
| 6,967,448 B2 | 11/2005 | Morgan et al. |
| 6,969,954 B2 | 11/2005 | Lys |
| 6,975,079 B2 | 12/2005 | Lys et al. |
| D518,218 S | 3/2006 | Roberge et al. |
| 7,014,336 B1 | 3/2006 | Ducharme et al. |
| 7,031,920 B2 | 4/2006 | Dowling et al. |
| 7,038,398 B1 | 5/2006 | Lys et al. |
| 7,038,399 B2 | 5/2006 | Lys et al. |
| 7,042,172 B2 | 5/2006 | Dowling et al. |
| 7,064,498 B2 | 6/2006 | Dowling et al. |
| 7,113,541 B1 | 9/2006 | Lys et al. |
| 7,132,785 B2 | 11/2006 | Ducharme |
| 7,132,804 B2 | 11/2006 | Mueller et al. |
| 7,135,824 B2 | 11/2006 | Lys et al. |
| 7,139,617 B1 | 11/2006 | Morgan et al. |
| 7,161,311 B2 | 1/2007 | Mueller et al. |
| 7,161,313 B2 | 1/2007 | Piepgras et al. |
| 7,161,556 B2 | 1/2007 | Morgan et al. |
| 7,178,941 B2 | 2/2007 | Roberge et al. |
| 7,180,252 B2 | 2/2007 | Mueller et al. |
| 7,186,003 B2 | 3/2007 | Dowling et al. |
| 7,187,141 B2 | 3/2007 | Mueller et al. |
| 7,202,613 B2 | 4/2007 | Morgan et al. |
| 7,204,622 B2 | 4/2007 | Dowling et al. |
| 7,220,015 B2 | 5/2007 | Dowling |
| 7,221,104 B2 | 5/2007 | Lys et al. |
| 7,228,190 B2 | 6/2007 | Dowling et al. |
| 7,231,060 B2 | 6/2007 | Dowling et al. |
| 7,233,115 B2 | 6/2007 | Lys |
| 7,233,831 B2 | 6/2007 | Blackwell |
| 7,242,152 B2 | 7/2007 | Dowling et al. |
| 7,248,239 B2 | 7/2007 | Dowling et al. |
| D548,868 S | 8/2007 | Roberge et al. |
| 7,253,566 B2 | 8/2007 | Lys et al. |
| 7,255,457 B2 | 8/2007 | Ducharme et al. |
| 7,256,554 B2 | 8/2007 | Lys |
| 7,274,160 B2 | 9/2007 | Mueller et al. |
| 7,300,192 B2 | 11/2007 | Mueller et al. |
| 7,303,300 B2 | 12/2007 | Dowling et al. |
| 7,308,296 B2 | 12/2007 | Lys et al. |
| 7,309,965 B2 | 12/2007 | Dowling et al. |
| 7,317,403 B2 * | 1/2008 | Grootes et al. ............ 340/815.45 |
| D562,494 S | 2/2008 | Piepgras et al. |
| 7,911,151 B2 * | 3/2011 | Xu ................................ 315/247 |
| 2002/0074559 A1 | 6/2002 | Dowling et al. |
| 2002/0078221 A1 | 6/2002 | Blackwell et al. |
| 2002/0130627 A1 | 9/2002 | Morgan et al. |
| 2002/0152045 A1 | 10/2002 | Dowling et al. |
| 2002/0176259 A1 | 11/2002 | Ducharme |
| 2003/0057884 A1 | 3/2003 | Dowling et al. |
| 2003/0057886 A1 | 3/2003 | Lys et al. |
| 2003/0076281 A1 | 4/2003 | Morgan et al. |
| 2003/0133292 A1 | 7/2003 | Mueller et al. |
| 2004/0052076 A1 | 3/2004 | Mueller et al. |
| 2004/0105261 A1 | 6/2004 | Ducharme et al. |
| 2004/0116039 A1 | 6/2004 | Mueller et al. |
| 2004/0135522 A1 | 7/2004 | Berman et al. |
| 2004/0141321 A1 | 7/2004 | Dowling et al. |
| 2004/0212993 A1 | 10/2004 | Morgan et al. |
| 2005/0035728 A1 | 2/2005 | Dowling et al. |
| 2005/0041161 A1 | 2/2005 | Dowling et al. |
| 2005/0047134 A1 | 3/2005 | Mueller et al. |
| 2005/0063194 A1 | 3/2005 | Lys et al. |
| 2005/0099824 A1 | 5/2005 | Dowling et al. |
| 2005/0116665 A1 | 6/2005 | Colby et al. |
| 2005/0116667 A1 | 6/2005 | Mueller et al. |
| 2005/0151489 A1 | 7/2005 | Lys et al. |
| 2005/0174473 A1 | 8/2005 | Dowling et al. |
| 2005/0213352 A1 | 9/2005 | Lys et al. |
| 2005/0213353 A1 | 9/2005 | Lys |
| 2005/0218870 A1 | 10/2005 | Lys |
| 2005/0219872 A1 | 10/2005 | Lys |
| 2005/0236998 A1 | 10/2005 | Mueller |
| 2005/0243022 A1 * | 11/2005 | Negru ............................ 345/46 |
| 2005/0248299 A1 | 11/2005 | Chemel et al. |
| 2005/0253533 A1 | 11/2005 | Lys et al. |
| 2005/0275626 A1 | 12/2005 | Mueller |
| 2005/0276053 A1 | 12/2005 | Nortrup |
| 2006/0002110 A1 | 1/2006 | Dowling |
| 2006/0012987 A9 | 1/2006 | Ducharme |
| 2006/0016960 A1 | 1/2006 | Morgan |
| 2006/0022214 A1 | 2/2006 | Morgan |
| 2006/0076908 A1 | 4/2006 | Morgan |
| 2006/0098077 A1 | 5/2006 | Dowling |
| 2006/0104058 A1 | 5/2006 | Chemel et al. |
| 2006/0109219 A1 | 5/2006 | Robinson et al. |
| 2006/0109649 A1 | 5/2006 | Ducharme et al. |
| 2006/0132061 A1 | 6/2006 | McCormick et al. |
| 2006/0152172 A9 | 7/2006 | Mueller |
| 2006/0158881 A1 | 7/2006 | Dowling |
| 2006/0170376 A1 | 8/2006 | Dowling et al. |
| 2006/0198128 A1 | 9/2006 | Piepgras et al. |
| 2006/0208667 A1 | 9/2006 | Lys |
| 2006/0221606 A1 | 10/2006 | Dowling |
| 2006/0244396 A1 | 11/2006 | Bucur |
| 2006/0262521 A1 | 11/2006 | Piepgras |
| 2006/0262544 A1 | 11/2006 | Piepgras |
| 2006/0262545 A1 | 11/2006 | Piepgras |
| 2006/0273741 A1 | 12/2006 | Stalker, III |
| 2006/0285325 A1 | 12/2006 | Ducharme et al. |
| 2007/0086754 A1 | 4/2007 | Lys et al. |
| 2007/0086912 A1 | 4/2007 | Dowling |
| 2007/0115658 A1 | 5/2007 | Mueller et al. |
| 2007/0115665 A1 | 5/2007 | Mueller et al. |
| 2007/0145915 A1 | 6/2007 | Roberge et al. |
| 2007/0152797 A1 | 7/2007 | Chemel et al. |
| 2007/0153514 A1 | 7/2007 | Dowling |
| 2007/0188114 A1 | 8/2007 | Lys et al. |
| 2007/0188427 A1 | 8/2007 | Lys et al. |
| 2007/0189026 A1 | 8/2007 | Chemel et al. |
| 2007/0195526 A1 | 8/2007 | Mueller et al. |
| 2007/0206375 A1 | 9/2007 | Piepgras et al. |
| 2007/0236156 A1 | 10/2007 | Lys et al. |
| 2007/0237284 A1 | 10/2007 | Lys et al. |
| 2007/0258231 A1 | 11/2007 | Koerner et al. |
| 2007/0258240 A1 | 11/2007 | Ducharme et al. |
| 2007/0263379 A1 | 11/2007 | Dowling et al. |
| 2007/0291483 A1 | 12/2007 | Lys et al. |
| 2008/0012502 A1 | 1/2008 | Lys |
| 2008/0012506 A1 | 1/2008 | Mueller et al. |

FOREIGN PATENT DOCUMENTS

| | | |
|---|---|---|
| EP | 0967590 | 12/1999 |
| EP | 0991304 | 4/2000 |
| EP | 1589519 | 10/2005 |
| WO | WO 98/21918 | 5/1998 |
| WO | WO 2004100612 | 11/2004 |

* cited by examiner

LED LIGHTING DEVICE

The present invention relates to a LED (light-emitting diode) lighting device comprising at least a first and a second LED powered by a switched mode power supply.

Such a device is disclosed e.g. in EP 0716485 A1.

In such a device, a switched mode power supply (SMPS) is controlled to supply a constant current to one or more LEDs. The LED light output may then be controlled through pulse width modulation by varying the duty cycle of a bypass switch which is connected in parallel with the LED/LEDs.

The SMPS is superior to a linear power supply in terms of energy efficiency. However, the precision of the supplied current may not be sufficient for all applications, because the load varies, which induces transients in the used current feedback system.

It is therefore an object of the present invention to provide a lighting device of the type mentioned in the opening paragraph, wherein the current precision is improved while maintaining a reasonably low power consumption.

This object is achieved by means of a lighting device as defined in claim 1.

More specifically, in the above-mentioned device, the current through the first LED is controlled by a first bypass switch, connected in parallel with the first LED, the current through the second LED is controlled by a second bypass switch, connected in parallel with the second LED, the first and second LEDs being connected in series between the switched mode power supply and a first constant current source, and the switched mode power supply is arranged to supply a number of different output voltages depending on the state of the first and second bypass switches, such that the voltage depends on the number of LEDs emitting light.

Due to the constant current source, a very well defined current is drawn from the power supply. However, since the output voltage is varied in dependence on the states of the LEDs, the dissipation in the constant current sources can be kept at a low level. No feedback of the actual current is needed, which prevents instability and transient problems.

In a preferred embodiment, the first and second LEDs are arranged to be controlled by pulse width modulation, such that the first and second LEDs are switched on simultaneously at the beginning of a pulse width modulation period and are switched off during the pulse width modulation period at instants determined by their respective duty cycles. Then the voltage of the switched mode power supply may be arranged to rise towards a maximum voltage before the beginning of the pulse width modulation period. This ensures that a sufficient voltage is provided at the start of the period.

The device may comprise means for driving the output voltage to zero or close to zero when all LEDs are switched off. This saves additional power.

The first and second LEDs may emit light of different colors.

The first and second LEDs may emit light having a green and a blue color and may be connected to the first constant current source via a third LED, which is controlled by a third bypass switch. The first and second LEDs may further be connected to a second constant current source via a fourth LED, which is controlled by a fourth bypass switch, the third and fourth LEDs emitting red or amber colored light. This allows a complete, controllable RGBA (red-green-blue-amber) light source realized with a single SMPS.

These and other aspects of the invention are apparent from and will be elucidated with reference to the embodiments described hereinafter.

FIG. 3b shows in more detail an example of the constant current source used in FIG. 3a.

Figure 1:
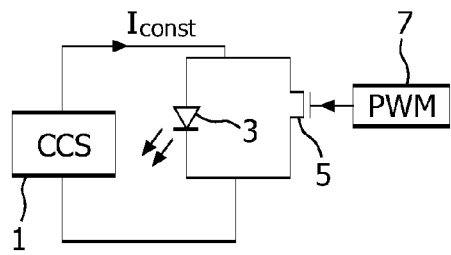
FIG. 1 illustrates schematically the bypass control of a LED driven by a constant current source of the prior art.

FIG. 1 illustrates schematically the bypass control of a LED driven by a constant current source of the prior art. A constant current source (CCS) 1 is arranged to feed a constant current $I_{const}$ to a LED 3 (Light Emitting Diode). For example, if the LED is a blue light-emitting LED, the constant current is typically $I_{const}$=700 mA. A bypass switch 5, typically a MOSFET, is connected in parallel with the LED 3. The bypass switch is controlled by PWM (Pulse Width Modulation) to either be fully conducting or fully blocking, using a PWM circuit 7. When the bypass switch 5 is fully conducting, it bypasses the LED 3, such that the LED stops emitting light. It is thus possible to control the light flow from the LED by varying the duty cycle of the bypass switch 5. This is done at a switching frequency that is high enough to prevent any visible flicker, e.g. 150 Hz or higher.

It is possible to have two LEDs, each having a bypass switch, share a common current source. Then the two LED/bypass switch combinations are connected in series with each other. The requirement is that the LEDs use the same driving current (e.g. red and amber light-emitting LEDs (350 mA) or blue and green light-emitting LEDs (700 mA)).

Figure 2:
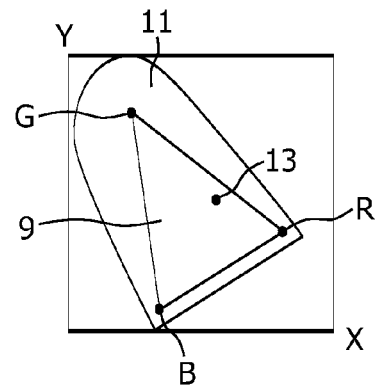
FIG. 2 illustrates schematically the available color gamut for an RGB LED arrangement.

FIG. 2 illustrates schematically, in a chromaticity diagram, the available color gamut for an RGB LED arrangement wherein the LEDs are controlled with bypass switches. By using a red R, a green G, and a blue B light-emitting LED in combination, a color triangle 9 covering a large part of the total color gamut 11 can be achieved. To emit light of a desired color 13, the PWM circuit of each LED is given a predetermined duty cycle, such that the correct amount of light is emitted from each LED to produce the desired color.

Figure 3A:
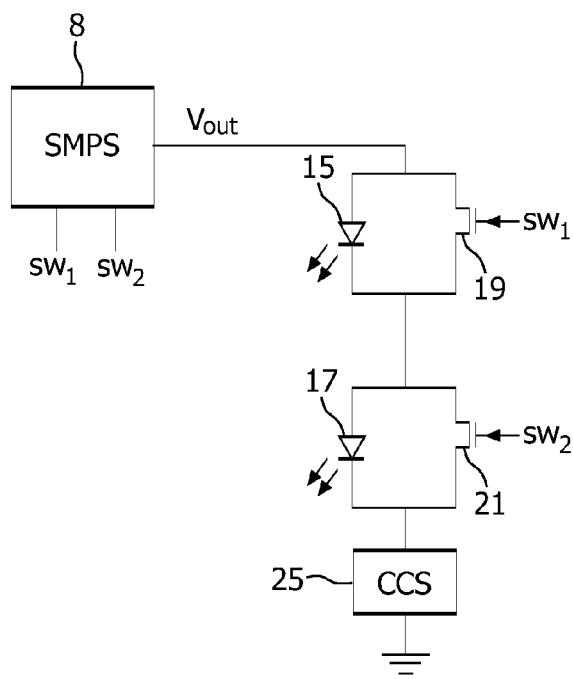
FIG. 3a illustrates schematically a LED lighting device in accordance with an embodiment of the invention.

FIG. 3a illustrates schematically a LED lighting device in accordance with an embodiment of the invention. It should be noted that the use of a switched mode power supply (SMPS) is considered to be advantageous, because an SMPS usually has a much better energy efficiency than a linear power supply.

It is possible to use an SMPS as a constant current source by placing a shunt resistor in series with the supplied LEDs and regulate the SMPS, based on the voltage across the shunt resistor, so as to supply the correct current. This approach is described e.g. in EP 0716485 A1. However, in practice, this may be quite complicated due to the high current precision requirements.

In an embodiment of the present invention, a different scheme is therefore used to control an SMPS. The embodiment shown in FIG. 3a has a first LED 15 and a second LED 17 which are connected in series and require the same constant current (e.g. a red and an amber light-emitting LED). The first LED 15 is controlled by a first bypass switch 19, which receives a first control signal $sw_1$. The second LED 17 is controlled by a second bypass switch 21, which receives a second control signal $sw_2$. The bypass switches are connected in parallel with the respective LED to PWM-control the current therethrough as described hereinbefore. The LEDs 15, 17 are powered by a switched mode power supply (SMPS) 8 having an output voltage $V_{out}$. The SMPS is also PWM-controlled but at a much higher frequency, e.g. a few hundred kHz. However, the output voltage $V_{out}$ is not controlled by measuring the current through the LEDs. Instead, the LEDs are connected in series between the SMPS 8 and a constant current source (CCS) 25.

As long as $V_{out}$ is high enough, the constant current source 25 ensures that a constant and predetermined current is drawn through the LEDs 15, 17 or the bypass switches 19, 21, if turned on.

Figure 3B:
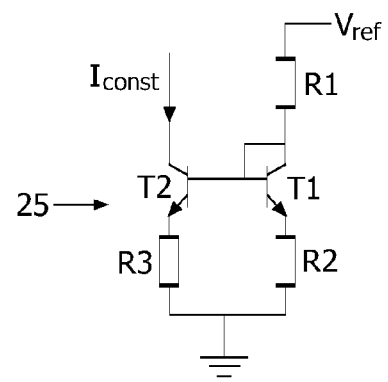

FIG. 3b shows in more detail an example of the constant current source 25 used in FIG. 3a. This constant current source is known per se and comprises a first bipolar transistor T1 and a second bipolar transistor T2, connected base to base. The first transistor T1 is diode-coupled (collector-base) and its collector is connected to a reference voltage $V_{ref}$ via a first resistor R1. The emitter of T1 is connected to ground via a second resistor R2. The emitter of T2 is connected to ground via a third resistor R3. This circuit will draw the constant current $I_{const}$ at the collector of T2. This constant current is determined by R1, R2, R3, $V_{ref}$ and the base-emitter voltage of T1 and T2, all of which are constant.

It is evident from FIG. 3a that the voltage drop across R3 in FIG. 3b will increase whenever a bypass switch 19, 21 is activated. Thus, if $V_{out}$ is kept constant, the power dissipation in the constant current source will be quite high. There are of course constant current source topologies other than the one illustrated in FIG. 3b, but this problem remains.

The SMPS 8 in this embodiment of the invention is therefore adapted to supply a number of different voltages depending on the states of the bypass switches 19, 21. This means that the output voltage $V_{out}$ varies in dependence on the number of activated LEDs. Typically, the SMPS 8 receives the control signals $sw_1$ and $sw_2$ of the bypass switches 19, 21 as input signals. Thus, if none of the bypass switches 19, 21 is activated and both LEDs 15, 17 emit light, $V_{out}$ has a first, high voltage. If one of the bypass switches 19, 21 is activated, the output voltage is forced down to a second, lower value. If both bypass switches are activated, $V_{out}$ can become 0 V, or close to 0 V, constituting a third value. The power dissipation in the constant current source 25 can thus be kept at a low level. The SMPS 8 may be preferably any type of step-down or buck-converter.

Figure 4:
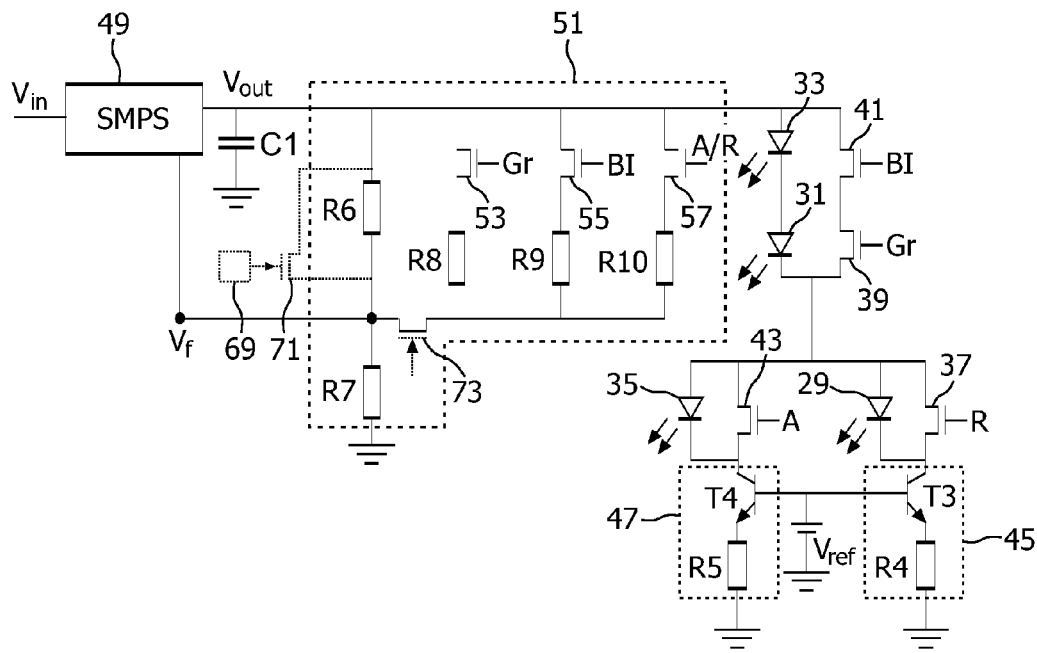
FIG. 4 illustrates an embodiment of the invention, in which an RGBA lighting arrangement is realized.

FIG. 4 illustrates an embodiment of the invention, in which an RGBA lighting arrangement is realized. In this embodiment, four LEDs (Red 29, Green 31, Blue 33, Amber 35) are used, each having a bypass switch 37, 39, 41 and 43, respectively. Each bypass switch 37, 39, 41, 43 receives a PWM control signal R, Gr, Bl, A to control the light flow of the corresponding LED.

The red light-emitting LED 29 is connected to a first constant current source 45 comprising a resistor R4 in series with a transistor T3. The amber light-emitting LED 35 is connected to a second constant current source 47 comprising a resistor R5 in series with a transistor T4. The bases of the transistors T3 and T4 may be connected to a common voltage reference $V_{ref}$. The first and second constant current sources 45, 47 are preferably identical, such that they draw the same current, which may be 350 mA for red and amber LEDs.

The red light-emitting LED 29, with its bypass switch 37 and series-connected constant current source 45, is connected in parallel with the amber light-emitting LED 35 with its bypass switch 43 and series-connected constant current source 47. These circuits may thus draw a total current of 700 mA, which is a suitable driving current for the green and blue light-emitting LEDs 31, 33. Together with their bypass switches 39, 41, the green and blue light-emitting LEDs 31, 33 may therefore be connected in series with the parallel arrangement of the red and amber light-emitting LEDs 29, 35. It is thus possible to supply all the LEDs from one common SMPS 49. In this embodiment, the red and amber light-emitting LEDs should be controlled in a synchronized manner. This requirement is, however, compatible with most color control schemes.

In order to minimize the dissipation in the constant current sources 45, 47, the SMPS 49 should be able to output four different output voltages depending on the number of turned-on LEDs (0, 1, 2 or 3, red and amber light-emitting LEDs being counted as one, as they are switched in synchronism). The feedback network 51 of the SMPS 49 is therefore adapted to receive the PWM control signals Gr, Bl, A/R of the bypass switches 37, 39, 42, 43. The feedback network 51 receives the output voltage $V_{out}$, which is filtered by an output capacitor C1. A voltage divider comprising two resistors R6 and R7 is connected between the SMPS output and ground and generates a divided feedback voltage Vf. In addition to R6, three resistors R8, R9 and R10 are connected between the SMPS output and R7. R8 is connected via a switch 53, which is controlled by the PWM control signal Gr of the bypass switch 39 of the green light-emitting LED 31. The switch 53 is thus switched on if the green LED 31 is switched off. Similarly, R9 is connected via a switch 55, which is controlled by the PWM control signal Bl of the bypass switch 41 of the blue LED 33. R10 is connected via a switch 57, which is controlled by the PWM control signal A/R of the bypass switches 37 and 43 of the red and amber light-emitting LEDs 29 and 35. The voltage-dividing function of the divider network will thus vary in dependence on the number of switched-on LEDs. For example, if all LEDs are switched on:

$$V_f = V_{out} * \frac{R7}{R7 + R6}$$

If the blue light-emitting LED 33 is then switched off, $V_f$ increases to $$V_f = V_{out} * \frac{R7}{R7 + \frac{R6 * R9}{R6 + R9}}$$

In the SMPS 49, $V_f$ is compared with an internal reference, and the output voltage is increased or decreased in conformity with this comparison. Thus, if $V_f$ increases when the blue LED is switched off as above, the output voltage $V_{out}$ decreases. This keeps the voltage across the constant current sources 45, 47 at a low level, thus preventing increased power dissipation therein. This does not only mean that energy is saved. The constant current sources 45, 47 can also have a lower heat-dissipating performance than in the case in which the SMPS output voltage is not regulated in this way.

This circuit may of course be adapted to other combinations of LEDs, e.g. RRGB (two red light-emitting LEDs, one green and one blue light-emitting LED), RGB or CMY (Cyan, Magenta and Yellow light-emitting LEDs).

Figure 5:
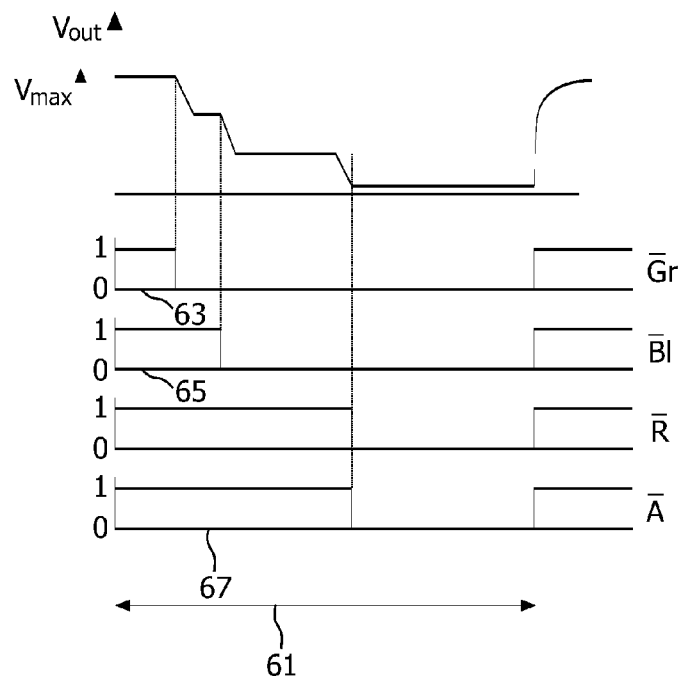
FIG. 5 illustrates a time diagram for the arrangement of FIG. 4.

FIG. 5 illustrates a time diagram for the arrangement of FIG. 4. In the upper part, FIG. 5 illustrates $V_{out}$ during a PWM period 61, which may be e.g. 2 ms long. The lower part shows the inverse of the LEDs PWM control signals Gr, Bl, R, A (R and A being switched in synchronism as mentioned before). When these signals are at level 1, the corresponding LED thus emits light. In the illustrated example, light of a predetermined color should be emitted. To obtain this color, in each PWM period, the green light-emitting LED emits light during a first time period 63, the blue light-emitting LED emits light during a second, longer time period 65, and the red and amber light-emitting LEDs emit light during a third, even longer, time period 67. The emission of light starts simultaneously for all LEDs but ends at different points in time. The output voltage $V_{out}$ starts the PWM period 61 at a first initial maximum voltage $V_{max}$. When the green light-emitting LED is turned off at the end of the first time period 63, the voltage drops to a second, lower voltage. Similarly, when the blue light-emitting LED is turned off, the voltage further drops to a third level. Finally, when the red and amber light-emitting LEDs are turned off, the voltage drops to a fourth minimal voltage. At the beginning of the subsequent PWM period, all LEDs are switched on and the SMPS output voltage again recovers to $V_{max}$, i.e. the voltage used when all LEDs are turned on.

With reference to FIGS. 4 and 5, the circuit shown in FIG. 4 can be modified in two ways in order to improve its function.

First, optional means can be provided to ensure that the output voltage is zero or close to zero when all LEDs are switched off. This may be e.g. a circuit 69 with a logic AND gate, the output of which goes high when Gr, Bl, and A/R all go high. This gate can then be used for driving a switch 71 short-circuiting R6, thus driving the output voltage to a very low value. This saves some energy consumption.

Secondly, means can be provided to ensure that the output voltage rises already before the start of each PWM period, such that $V_{out}$ has already reached $V_{max}$ when the LEDs are turned on. This can be realized by adding an optional switch 73 that is arranged to disconnect resistors R8, R9, and R10 during a short time period before the PWM period begins. This ensures that the constant current sources can draw the correct currents already from the start, thus precluding potential color errors. If the optional switch 73 is not used, R8, R9, and R10 are instead connected directly to the voltage divider of R6 and R7.

In summary, the invention relates to a multiple LED driver circuit in which each LED is controlled by a bypass switch. The LEDs are supplied by a switched mode power supply and are connected to a constant current source to draw a predetermined current through the LEDs. The switched mode power supply is arranged to output different voltages depending on the number of switched-on LEDs. This is carried out by supplying the control signals of the bypass switches to the switched mode power supply. In this way, the power dissipation of the constant current source can be kept at a low level.

The invention is not limited to the embodiments described hereinbefore. It can be altered in different ways within the scope of the appended claims.

The invention claimed is:

1. A LED lighting device comprising at least a first and a second LED supplied by a switched mode power supply, wherein the current through the first LED is controlled by a first bypass switch, connected in parallel with the first LED, the current through the second LED is controlled by a second bypass switch, connected in parallel with the second LED, the first and second LEDs being connected in series between the switched mode power supply and a first constant current source, and wherein the switched mode power supply is arranged to supply a number of different output voltages depending on the state of the first and second bypass switches, such that the voltage depends on the number of LEDs emitting light; wherein the first and second LEDs emit light of a green and blue color, respectively, and are connected to the first constant current source via a third LED, which is controlled by a third bypass switch, wherein the first and second LEDs are connected to a second constant current source via a fourth LED, which is controlled by a fourth bypass switch, and wherein the third and fourth LEDs emit red or amber-colored light.

2. A LED lighting device according to claim 1, wherein the first and second LEDs are arranged to be controlled by pulse width modulation, such that the first and second LEDs are switched on simultaneously at the beginning of a pulse width modulation period and are switched off during the pulse width modulation period at instants determined by their respective duty cycles.

3. A LED lighting device according to claim 2, wherein the switched mode power supply is arranged to rise towards a maximum voltage before the beginning of the pulse width modulation period.

4. A LED lighting device according to claim 1, comprising means for driving the output voltage to zero or close to zero when all LEDs are switched off.

5. A LED lighting device comprising:
at least a first and a second LED supplied by a switched mode power supply, wherein the current through the first LED is controlled by a first bypass switch connected in parallel with the first LED, the current through the second LED is controlled by a second bypass switch connected in parallel with the second LED, the first and second LEDs being connected in series between the switched mode power supply and a first constant current source, and wherein the first and second LEDs emit light of a green and blue color, respectively, and are connected to the first constant current source via a third LED, which is controlled by a third bypass switch, wherein the first and second LEDs are connected to a second constant current source via a fourth LED, which is controlled by a fourth bypass switch, and wherein the third and fourth LEDs emit red or amber colored light.

* * * * *